2,890,591

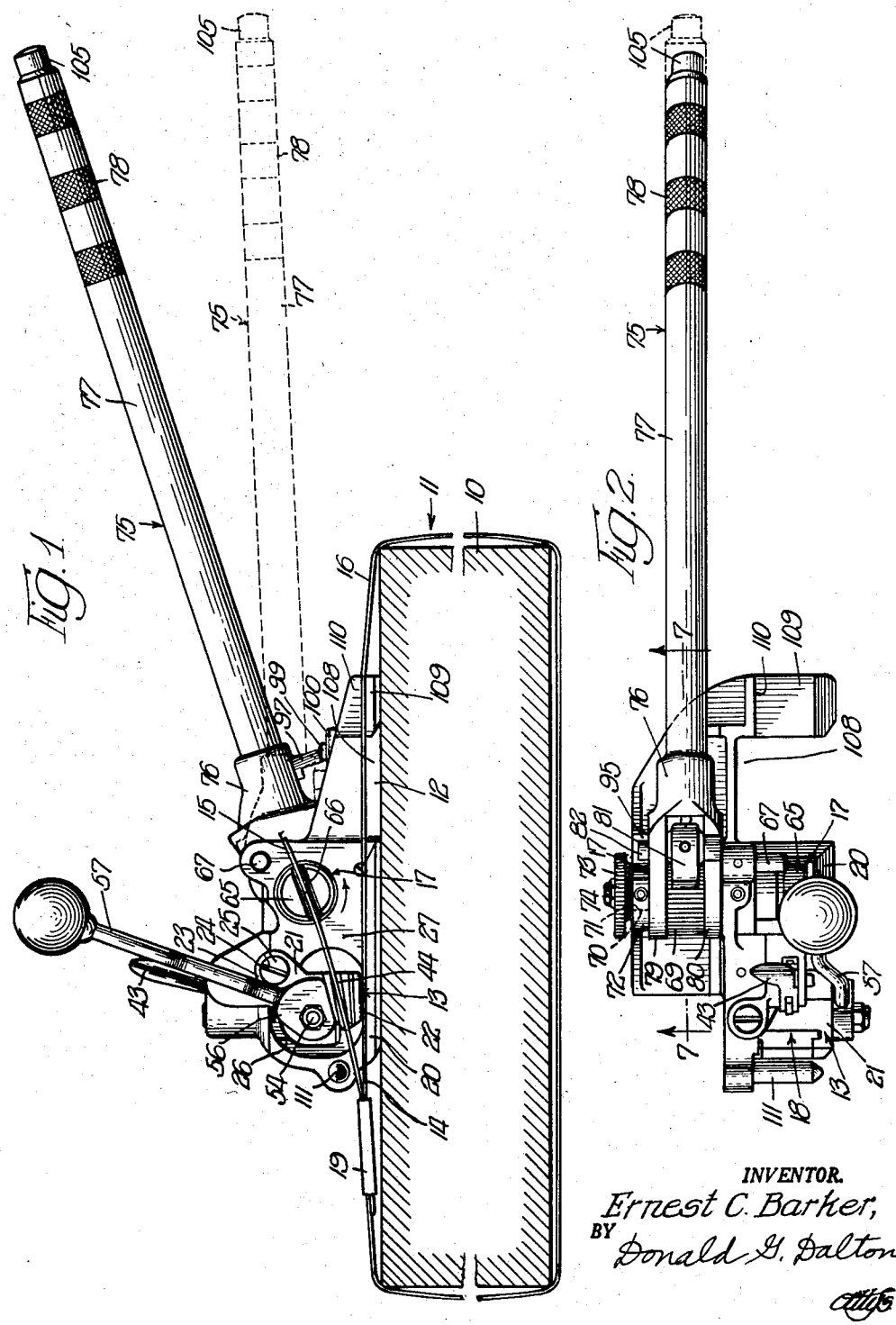
June 16, 1959 — E. C. BARKER — 2,890,591
STRAP-TENSIONING TOOL
Original Filed Nov. 5, 1951 — 2 Sheets-Sheet 1
INVENTOR.
Ernest C. Barker,
BY Donald G. Dalton

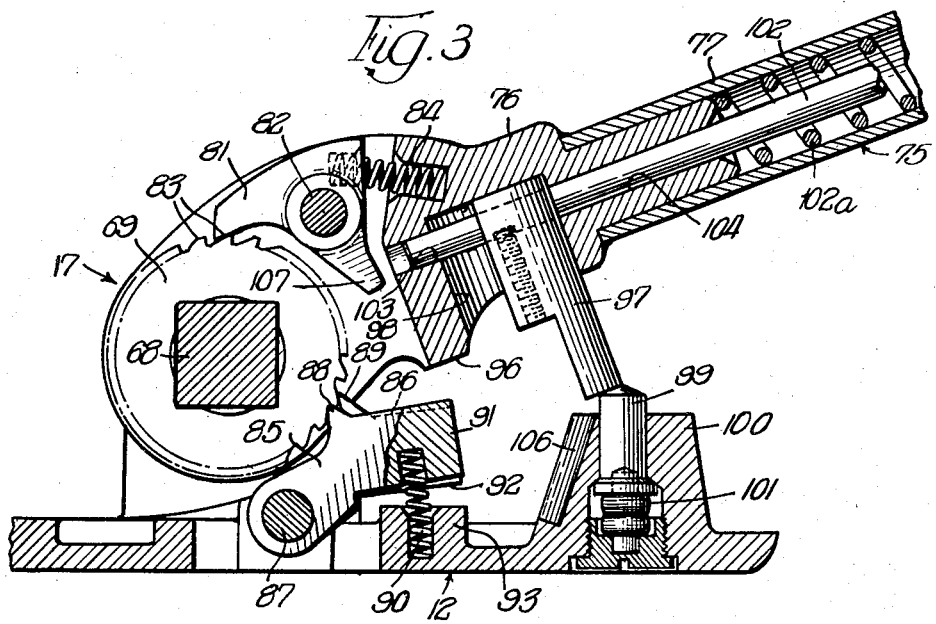

STRAP-TENSIONING TOOL

Ernest C. Barker, La Grange Highlands, Ill., assignor to United States Steel Corporation, a corporation of New Jersey Original application November 5, 1951, Serial No. 254,875, now Patent No. 2,751,939, dated June 26, 1956. Divided and this application October 28, 1955, Serial No. 543,573

3 Claims. (Cl. 74—154)

This invention relates to a portable heavy-duty tool for use in tensioning a strap about an object or group of objects with the ends of the strap arranged in overlapped relation to receive a seal.

This is a division of my co-pending application Serial No. 254,875, filed November 5, 1951.

The purpose of the invention is to provide, in a tool of this type, improved strap-tensioning means which render the tool not only highly efficient but very simple and easy to manipulate.

In the accompanying drawings:

Figure 1 is a front view of the new tool;

Figure 2 is a fragmentary rear view of a portion of the tool at the location of the tensioning mechanism;

Figure 3 is a fragmentary vertical section through the tensioning mechanism; and Figure 4 is a view similar to Figure 3 showing the tensioning mechanism in its fully released position.

Described generally, the tool includes an elongated frame 12, a gripping mechanism 13 near the left end of the frame for holding one end of the strap stationary while the other end is being pulled to put the looped part under the desired degree of tension, a tensioning mechanism 17 to the right of the gripping mechanism for engaging and pulling said other end.

The frame 12 of the tool includes a base with a low flat forwardly projecting foot portion 20. The stationary or fixed end of the strap is adapted to be placed over the foot portion 20 and clamped immovably against the same by the gripping mechanism 13.

The gripping mechanism 13 includes a dog 21 pivoted directly above the foot portion 20. The dog 21 is provided on the bottom thereof with serrations 22 which bite into the upper surface of the strap end when the dog is moved downwardly, whereby to hold said end against movement to the right. The dog 21 is provided at the upper right hand corner thereof with a hub 23 which fits in an arcuate socket 24 in the upper portion of the frame and is pivotally mounted for free movement on a pin 25 fixed in the frame in concentric relation to the socket.

As the serrations 22 on the dog are located in a plane to the left of the pivotal axis of the dog, tension on that end of the strap toward the right will act to tighten the grip of the dog.

The dog 21 is provided, immediately above the serrated lower face thereof, with a forwardly opening slot 44 for freely accommodating the movable end of the strap in its passage toward the right to the tensioning mechanism 17. The slot 44, which is disposed at a slight inclination to avoid deflecting, or being deflected by, the inclination of the movable strap end resulting from the relatively elevated location of the tensioning mechanism, is beveled along its upper and lower front edges 45 and 46 to facilitate insertion of the strap from the front.

The tensioning mechanism 17 includes a shaft 62 which is located to the right of the dog 21 and is journalled in a bore 63 in wall 27 of the frame 12. The front end 65 of the shaft projects forwardly into the plane of the dog 21 and is provided with a forwardly opening diametral slot 66 in which the end 15 of the strap is adapted to be positioned.

When the shaft 62 is rotated in a counter-clockwise direction, by the means hereinafter described, the slotted forwardly projecting end 65 of the shaft, which constitutes a tensioning head, will wind the end 15 of the strap on such head and pull the strap tight about the object or objects being banded, with any desired degree of tension.

The shaft 62 is adapted to be rotated in a counter-clockwise direction by means of a long hand lever 75. The hand lever 75 consists of a clevis head 76 and a tube 77 thereon. The head 76 is secured to the inner end of the tube 77 and the spaced arms 79 and 80 thereof span the ratchet wheel 69 and are journalled for free rotation on the circular portions of the shaft on each side of the latter, thus providing a free pivotal mounting for the hand lever 75.

A driving pawl 81 is pivotally mounted in the head 76 between the arms 79 of the latter on a pin 82 to which it is keyed, and is pressed into one-way driving engagement with the teeth 83 of the ratchet wheel by a coil spring 84.

The ratchet wheel 69 is normally prevented from turning in a clockwise direction by a pair of holding pawls 85 and 86 pivotally mounted on the base of the frame 12 by a pin 87. The pawl points 88 and 89 are located at different distances from the pivotal axis of the pawls, and but one of the pawls locks with the ratchet wheel at a time. This provides holding positions twice the number of teeth 83 on the ratchet wheel, thereby permitting such teeth to be made larger and consequently stronger. The holding pawls 85 and 86 are pressed into one-way locking engagement with the ratchet wheel 69 by coil springs 90 compressed between extensions 91 and 92 on the pawls and an underlying boss 93 on the frame 12.

When the hand lever 75 is swung toward the right beyond its normal working range into the extreme out-of-the-way position shown in Figure 4, a flat 94 formed on the rear end of the pivot pin 82 to which the driving pawl 81 is attached will engage a shoulder 95 on bracket 72 at the rear edge of the frame 12 and will rock the pin 82 far enough to disengage the pawl 81 from the ratchet wheel 69, as shown in Figure 4. At the same time a shoulder 96 on the bottom of the head 76 will engage the extensions 91 and 92 on the holding pawls 85 and 86 and will force them downwardly into contact with the boss 93 on the frame, thereby disengaging both of the holding pawls from the ratchet wheel 69. In this extreme out-of-the-way position of the hand lever 75, the ratchet wheel is free to turn in either direction and the tensioning head 65 can therefore be easily adjusted by knob 73 to properly position the slot 66 therein to receive the strap end 15.

The hand lever 75 is normally prevented from being swung down into this extreme position, however, by means of a stop pin 97 extending laterally from head 76 through a slot 98 therein. Pin 97 is adapted to strike a cushioned upstanding stud 99 carried by the frame 12, which holds the lever in an initial out-of-the-way position as shown in Figure 3. The stud 99 extends upwardly through a bore in a raised portion 100 of the frame and is supported by a bushing screwed into the bottom of the bore, on a shock-absorbing pad 101.

The stop pin 97 is shiftable lengthwise of the hand lever 75 in the slot 98, being carried by a push rod 102 slidably supported in bores 103 and 104 in the head 76 and extending through the tube 77 to the outer end of the hand lever. The rod 102 is urged axially toward the outer end of the hand lever by a compressed coil spring 102a and has an exposed push button slidably mounted in the end of the tube 77.

When the push button is depressed the pin 97 will be shifted inwardly clear of the stud 99, whereupon the hand lever may be moved all the way down to its extreme out-of-the-way position to completely disengage all pawls from the ratchet wheel 69. As the hand lever is moved downwardly into its extreme position the lower end of the pin 97 will cam against an inclined surface 106 on the raised portion 100 of the frame, which will not only act to effect further the inward shifting movement of the pin 97 but to hold it from return to normal position.

The inner end of the rod 102 projects inwardly beyond the portion of the head 76 in which it is slidably mounted, in axial alignment with an extension 107 on the driving pawl 81, and when the rod 102 is pushed in as far as it will go, beyond the position shown in Figure 4, which may be done by means of the push button on the rod in any position of the hand lever 75, the inner end of the rod will rock the driving pawl 81 and disengage it from the ratchet wheel 69 without disturbing the locked engagement of the holding pawls 85 and 86 with the ratchet.

The manner in which the improved machine is adapted to be used will now be briefly summarized.

After the fixed end of the strap has been placed under the dog 21 the handle 43 is flipped to the right, thereby permitting the dog to be forced down into clamped engagement with that end of the strap by spring 29. A seal may be sleeved over or otherwise loosely associated with the fixed end of the strap either before or after the latter has been placed under the dog 21, whichever is more convenient.

The movable end of the strap, after being threaded through or otherwise associated with the seal over the fixed end of the strap, is then placed in the slot 44 in the dog 21 and in the slot 66 in the tensioning head 65. If the slot 66 does not happen to be in the proper angular position to receive the end 15, it can be turned easily in either direction by pressing in on the push button of rod 102, lowering the tensioning lever 75 into its extreme down position and then turning the wheel 69 by hand.

The lever 75 is then oscillated left and right, causing the head 65 to turn step-by-step in a counter-clockwise direction, thereby wrapping the end 15 of the strap around it. The extent to which the tensioning lever 75 will be swung to the left, or the number of times which it will be oscillated will vary with the amount of slack present in the looped section of the strap and the amount of tension desired.

After the desired tension has been established and the seal has been crimped to the over-lapped ends of the strap by means of any suitable sealing tool, the movable end of the strap is severed adjacent the seal.

If, at any time during the tensioning operation, the position reached by the tensioning lever 75 is not a convenient one in which to apply the required amount of pressure, and it is desired to advance the position of that lever relative to the tensioning head 65, it is merely necessary for the operator to press in on the push button of rod 102, whereupon the driving pawl 81 on the lever will be disengaged from the ratchet wheel 69 and the lever may be moved forwardly into a more convenient position.

If it becomes necessary to temporarily relieve the tension on the strap before the seal is crimped, in order to rearrange the same with respect to the edges of the object or the corner clips sometimes used, this can easily be done by moving the tensioning lever 75 all the way down to the right, with the push button pressed in, thus causing holding pawls 85 and 86 to be disengaged from the ratchet wheel 69. In the normal operation of lever 75 it is prevented from being moved all the way down to the right by the stop pin 97, which prevents holding pawls 85 and 86 from being unintentionally released from the ratchet wheel 69.

I claim:

1. In a strap-tensioning tool, a frame including a base and a wall upstanding thereon, a shaft journalled in said wall having a winding head at one end and a ratchet wheel non-rotatable thereon, a hand lever journalled on said shaft, a pawl pivoted on said lever adapted to drive said wheel, a holding pawl pivoted on said base effective to prevent rotation of the shaft and head in the unwinding direction, a push rod slidable on said lever effective when actuated to move the driving pawl away from engagement with the wheel, means constantly urging said rod to a normal position out of engagement with said pawl, a stop pin projecting laterally from said push rod and a fixed abutment upstanding on said base in a location to be engaged by said pin when the lever is swung to an out-of-the-way position with said push rod in normal position.

2. The combination defined by claim 1, characterized by a cam surface on said base at one side of said abutment, engageable by said pin when displaced to clear said abutment, on continued movement of the lever past said out-of-the-way position, said surface thereafter preventing movement of the push rod to normal position.

3. In a strap-tensioning tool, a frame including a base and a wall upstanding thereon, a shaft journalled in said wall having a winding head at one end and a ratchet wheel non-rotatable thereon, a hand lever journalled on said shaft, a pawl pivoted on said lever adapted to drive said wheel, a holding pawl pivoted on said base effective to prevent rotation of the shaft and head in the unwinding direction, said holding pawl being disposed below said wheel and having an extension projecting laterally thereof, said lever having a shoulder effective to engage said extension and retract the holding pawl from engagement with said wheel when said lever is swung to an out-of-the-way position, and a bearing block on said base adapted to be engaged by said extension when the holding pawl is retracted, thereby supporting said lever in said position.

References Cited in the file of this patent

UNITED STATES PATENTS

| 357,032 | Raynes | Feb. 1, 1887 |
| 806,349 | Knight | Dec. 5, 1905 |
| 1,786,970 | Vaughn | Dec. 30, 1930 |
| 1,904,178 | Vaughn | Apr. 18, 1933 |
| 2,212,165 | Neate et al. | Aug. 20, 1940 |